Dec. 23, 1969    H. J. DONELSON, JR    3,485,536
MATERIAL SPREADER
Filed Nov. 17, 1967    3 Sheets-Sheet 1
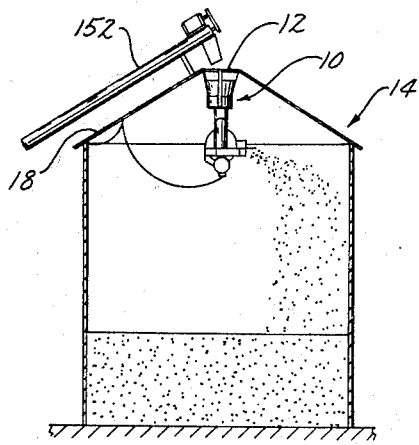
Fig.1
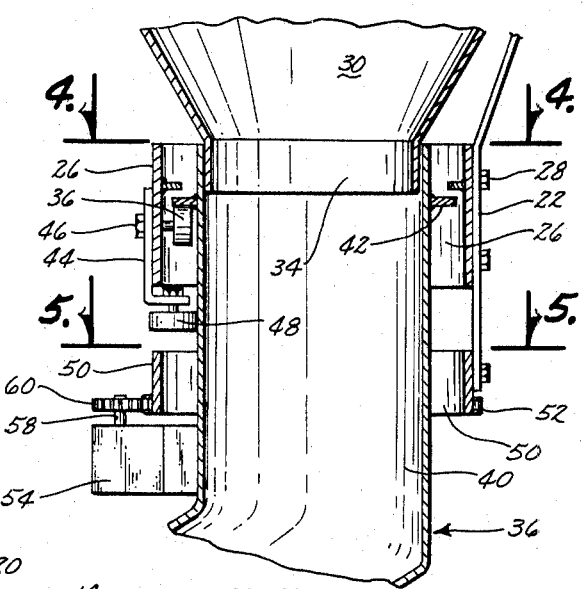
Fig.3
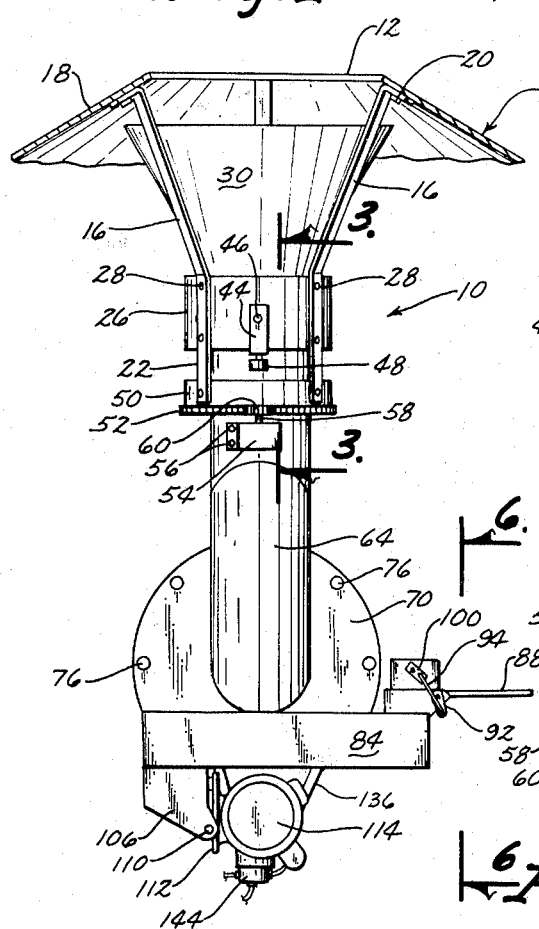
Fig.2
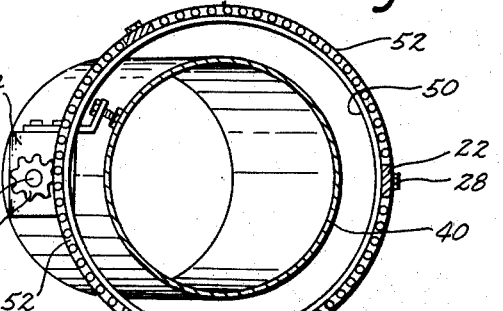
Fig.4
Fig.5
INVENTOR
HARLAN J. DONELSON
BY
Dick, Zarley, McKee & Thomte
ATTORNEYS Dec. 23, 1969   H. J. DONELSON, JR   3,485,536
MATERIAL SPREADER Filed Nov. 17, 1967                        3 Sheets-Sheet 2

INVENTOR
HARLAN J. DONELSON
BY
Dick, Zarley, McKee & Thomte
ATTORNEYS

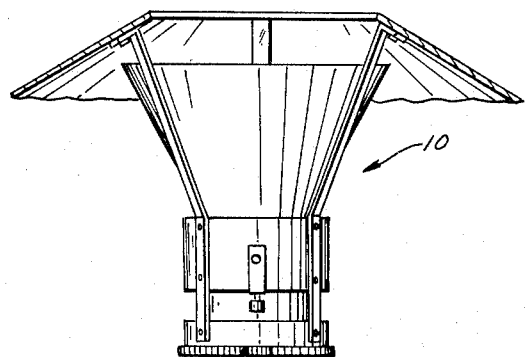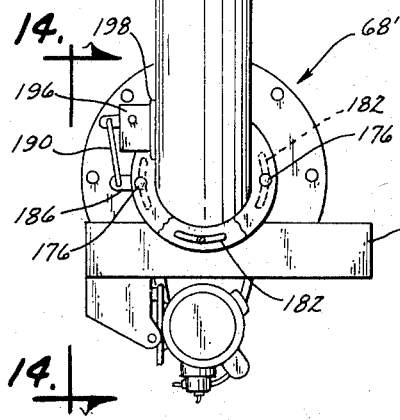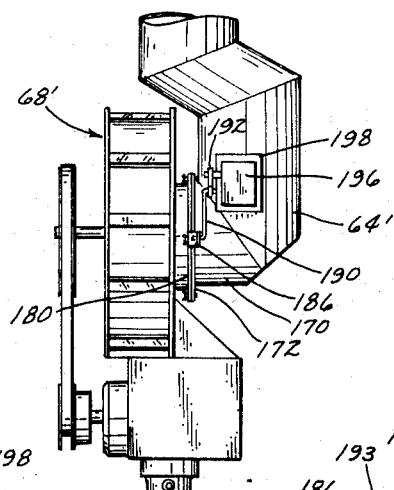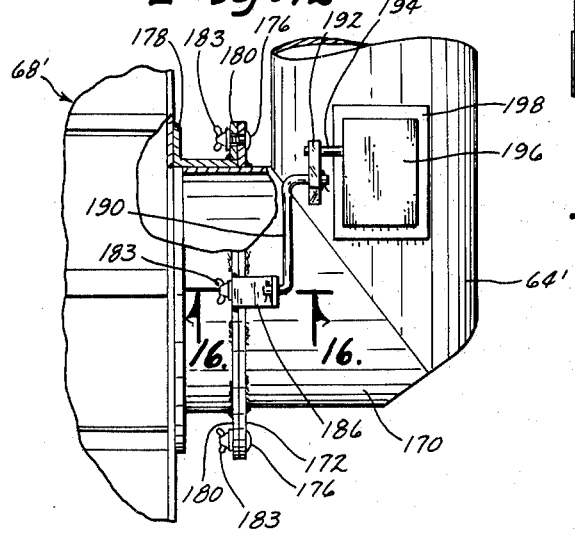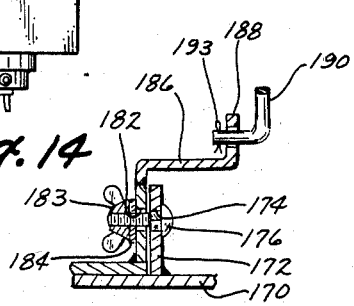

United States Patent Office 3,485,536
Patented Dec. 23, 1969

3,485,536
MATERIAL SPREADER
Harlan J. Donelson, Jr., Marshalltown, Iowa, assignor to Remington Arms Company, Inc., Bridgeport, Conn., a corporation of Delaware
Filed Nov. 17, 1967, Ser. No. 683,892
Int. Cl. B65g 53/40, 31/00, 65/30
U.S. Cl. 302—60                                      3 Claims

ABSTRACT OF THE DISCLOSURE

A material spreader for depositing material such as corn, silage, beans or the like in closed storage areas such as granaries, silos, etc. The spreader consists of a variable speed blower means which is secured below a hopper which is positioned at the upper open end of the storage area. The blower means is rotatably movable with respect to the hopper so that the material can be selectively blown away from the blower means to various portions of the storage area so that the material is evenly and uniformly deposited therein.

---

It is one of the objects of this invention to provide a material spreader which may be mounted in the top inlet end of a granary or the like for distributing the grain uniformly throughout the storage area in the granary.

A further object of this invention is to provide a variable speed material spreader wherein the pattern of grain distribution may be varied.

A further object of this invention is to provide a variable speed material spreader which may be remotely controlled from outside of the granary.

A further object of this invention is to provide a variable speed material spreader having a blower means rotatably mounted below a hopper means, the blower means being rotatable with respect thereto to vary the direction of the discharged material.

A further object of this invention is to provide a material spreader including a blower means having a deflecting plate pivotally mounted at the discharge end thereof to vary the pattern of grain distribution.

A further object of this invention is to provide a material spreader which permits the grain to be uniformly and evenly distributed throughout the storage area.

A further object of this invention is to provide a material spreader which is economical of manufacture, durable in use and refined in appearance.

These and other objects will be apparent to those skilled in the art.

This invention consist in the construction, arrangements, and combination of the various parts of the device, whereby the objects contemplated are attained as hereinafter more fully set forth, specifically pointed out in the claims, and illustrated in the accompanying drawings in which:

FIG. 1 is a side plan view of a granary having the material spreader mounted at the upper inlet end thereof;

FIG. 2 is a side view of the material spreader;

FIG. 3 is an enlarged sectional view as seen on line 3—3 of FIG. 2;

FIG. 4 is a sectional view as seen on line 4—4 of FIG. 3 with portions thereof cut away to more fully illustrate the invention;

FIG. 5 is a sectional view as seen on line 5—5 of FIG. 3;

FIG. 12 is a side view of a modified form of the material spreader;

FIG. 13 is a fragmentary side view of the modification of FIG. 12 with broken lines indicating the position to which the blower means may be rotated;

FIG. 14 is an enlarged sectional view as seen on line 14—14 of FIG. 12;

FIG. 15 is a fragmentary side view of the modification of FIG. 12 illustrating the connection between the blower housing and the lower end of the chute with portions thereof cut away to more fully illustrate the invention; and FIG. 16 is an enlarged sectional view as seen on line 16—16 of FIG. 15.

Figure 6:
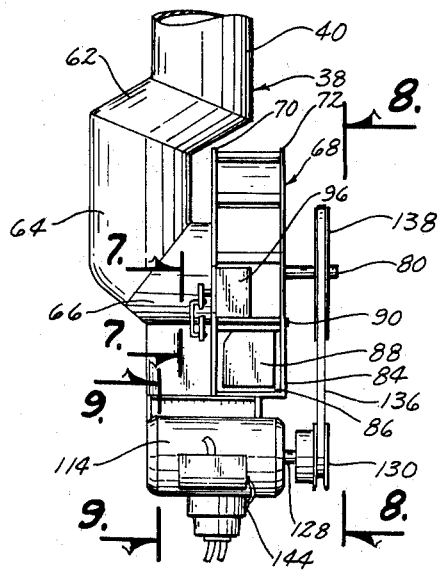
FIG. 6 is a side view of the lower portion of the spreader as would be seen on line 6—6 of FIG. 2.

The material spreader illustrated in FIGS. 1–11 is generally designated by the reference numeral 10 and is adapted to be mounted in the open upper end 12 of a granary 14. A plurality of braces 16 are secured to the roof 18 of granary 14 by bolts 20 and extend downwardly therefrom as seen in FIG. 2. Each of the braces 16 include a vertical portion 22 at the lower end thereof and a collar 26 is secured to the vertical portion 22 of each of the braces 16 by a plurality of bolts 28 as seen in FIGS. 2 and 3.

A hopper 30 is secured to the braces 16 as seen in FIG. 2 and includes an open upper end 32 and an open cylindrical shaped lower end 34. As seen in FIG. 3, the lower end 34 of hopper 30 is positioned inwardly of collar 26. Collar 26 is provided with a plurality of roller elements 36 which are secured thereto and which are mounted inwardly thereof as seen in FIGS. 3 and 4. The numeral 38 generally designates a spout means having a cylindrical upper end 40 which is positioned within collar 26 and which receives the lower end 34 of hopper 30 as seen in FIG. 3. Upper end 40 of spout 38 has an outwardly extending flange 42 secured thereto by welding or the like which engages the roller elements 36 on collar 26 to permit the spout 38 to be rotated with respect to hopper 30 and collar 26 and to limit the downward movement of spout 38 with respect to sleeve 26. A bracket 44 is secured to sleeve 26 by a bolt 46 and has a roller element 48 secured thereto which is rotatable about a vertical axis and which is designed to engage the upper end 40 of spout 38 as seen in FIG. 3 to prevent undesirable wobbling of the spout 38 when the same is rotated with respect to the hopper 30.

A drive ring 50 is secured to the lower ends of the braces 16 and is spaced outwardly of upper end 40 of spout 38 as seen in FIG. 3. A drive chain 52 embraces the lower outer end of the drive ring 50 and is secured thereto by any convenient means such as welding or the like. A drive motor 54 is secured to spout 38 by bolts 56 and has a power shaft 58 extending therefrom which has a gear 60 rigidly affixed thereto. Gear 60 is in engagement with chain 52 and the rotation of gear 60 by motor 54 will cause spout 38 to be rotated with respect to drive ring 50. Motor 54 is of the variable speed, reversible type commonly available.

Figure 8:
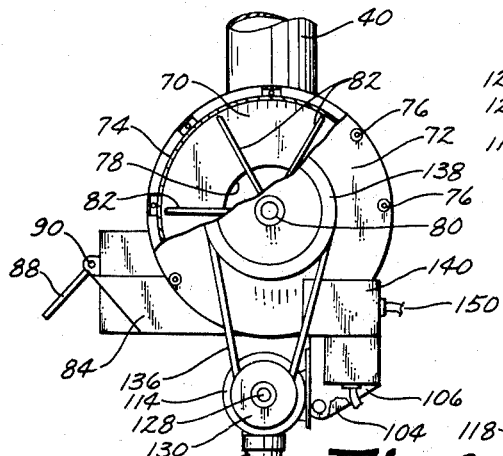
FIG. 8 is a side view of a portion of the apparatus as seen on line 8—8 of FIG. 6 with portions thereof cut away to more fully illustrate the invention.

Spout 38 also includes a spout portion 62 which extends downwardly and outwardly from the upper end 40 as seen in FIG. 6. A spout portion 64 extends downwardly from the lower end of spout portion 62 while a horizontal spout portion 66 extends horizontally from the lower end of spout portion 64. A blower means 68 is secured to the end of spout portion 66 as seen in the drawings and includes spaced apart wall members 70 and 72 having a peripheral wall member 74 extending therebetween. As seen in FIG. 8, wall members 70 and 72 are secured together by a plurality of bolt assemblies 76. As also seen in FIG. 8, wall 70 is provided with a central opening 78 which is in communication with the interior of spout means 38. A shaft 80 is rotatably mounted in blower means 68 and extends outwardly therefrom as seen in FIG. 6. A plurality of fins 82 are mounted on shaft 80 within blower means 68 and extend radially therefrom.

Blower means 68 includes a horizontally extending discharge chute means 84 having a discharge opening 86 at the outer end thereof.

Figure 7:
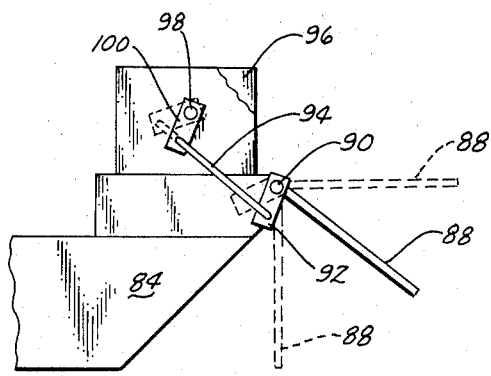
FIG. 7 is a plan view of the deflecting plate at the discharge end of the blower means as seen on line 7—7 of FIG. 6.

It is seen in FIGS. 6, 7 and 8, a deflecting plate 88 is secured to a pin 90 which is rotatably mounted in discharge chute 84. A link 92 is rigidly secured at one end thereof to one end of pin 90 and has an arm member 94 pivotally secured to its other end. The numeral 96 designates a reversible electric motor having a power shaft 98 extending therefrom. A link 100 is rigidly secured at one of its ends to the other end of power shaft 98 and has its other end pivotally connected to arm 94. Thus, as illustrated in FIG. 7, the rotation of power shaft 98 will cause the deflecting plate 88 to be pivotally moved with respect to the discharge opening 86 so that the material being discharged from chute 84 may be deflected by the deflecting plate 88 if so desired.

Figure 9:
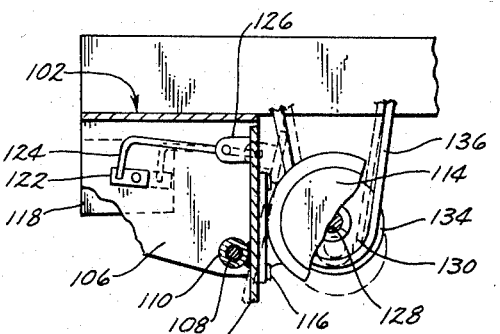
FIG. 9 is an enlarged sectional view as would be seen on line 9—9 of FIG. 6, with the pivotal movement of the apparatus being shown by broken lines.
Figure 10:
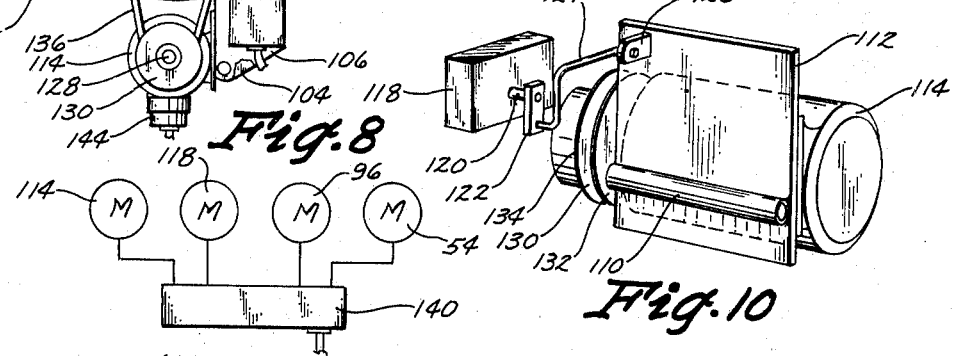
FIG. 10 is a perspective view of the speed control apparatus for the blower means.

A bracket 102 is operatively connected to blower means 68 by any convenient means such as welding or the like and includes a pair of spaced apart wall members 104 and 106. A rod 108 extends between walls 104 and 106 and has a sleeve 110 rotatably mounted thereon. A plate 112 is welded to sleeve 110 and a reversible, electric motor 114 is secured to plate 112 by bolts 116. A speed control motor 118 is secured to wall 106 of bracket 102 and has a power shaft 120 rotatably extending therethrough. A link 122 is rigidly connected at one of its ends to the outer end of power shaft 120 and has an arcuate arm member 124 pivotally secured to its other end. The other end of arcuate arm member 124 is pivotally connected to a tab 126 which is secured to the back side of plate 112 and extends therefrom as seen in FIG. 10. As seen in FIG. 9, the rotation of power shaft 120 by motor 118 will cause link 122 to be rotated thereby causing arm member 124 to pivotally move plate 112 and motor 114 with respect to bracket 102. Motor 114 has a power shaft 128 extending therefrom and a variable speed pulley means 130 is secured thereto. Pulley means 130 is of conventional design and consists of a fixed pulley sheave 132 and a movable pulley sheave portion 134. A belt 136 extends around pulley 130 and extends around a pulley 138 which is connected to the outer end of shaft 180 on blower means 68.

Figure 11:
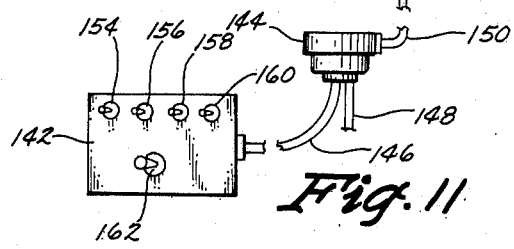
FIG. 11 is a schematic drawing of the electrical circuitry of this invention.

The numeral 140 designates a junction box which is secured to blower means 68 and bracket 102. The numeral 142 designates an electric control box which is connected to a swivel 144 by a conduit 146. Conduit 146 is connected to a conduit 148 within swivel 144 and conduit 148 is connected to a source of electrical power. Junction box 140 is connected to conduits 146 and 148 within swivel 144 by a conduit 150. Motors 114, 118, 96 and 54 are electrically connected to junction box 140 as indicated in FIG. 11. Thus, the various switches on electric control box 142 may be selectively operated to activate one of the respective motors 114, 118, 96 or 54.

In operation, the material spreader 10 is positioned in the open upper end 12 of the granary 14 as previously described and as illustrated in FIG. 1. Material to be deposited within the granary 14 is supplied to the upper end of hopper 30 by a conveyor means similarly designated by the reference numeral 152. Toggle switch 154 would be moved to cause the activation of motor 114 which causes the shaft 80 and the fins 82 to be rotated so that the material being supplied thereto by a hopper 30 and spout 38 will be blown therefrom outwardly through discharge opening 86. If desired, toggle switch 158 may be moved to cause the activation of the deflecting plate motor 96 so that the deflecting plate 88 may be moved into the path of the material being discharged from discharge opening 86 so that the same may be selectively deflected to various portions of the interior of the granary. It is obvious that when deflecting plate is in the lowermost position, illustrated by broken lines in FIG. 7, the material will be discharged closer towards the center of the granary. It is also obvious that when the deflecting plate 88 is raised to its upper most position, illustrated by broken lines in FIG. 7, that the material being discharged from discharge opening 86 will be blown outwardly towards the walls of the granary 14.

Toggle switch 160 may also be moved to cause the activation of motor 54 which will cause the rotation of spout means 38 and hence the rotation of blower means 68 and the structure associated therewith. The rotation of spout means 38 with respect to the hopper 30 will cause the material being discharged from discharge opening 86 to be varied. Motor 54 may be continuously operated so that the spout means 38 continually rotates or it may be periodically operated to selectively direct the material into various portions of the granary.

The speed of rotation of shaft 80 and hence the fins 82 may be varied by the activation of speed control motor 118. As seen in FIG. 9, the activation of speed control motor 118 will cause link 122 to be rotated which in turn causes the motor 114 to be pivotally moved towards or away from the shaft 80 which causes the variable speed pulley 130 to close and open respectively to decrease and increase the speed of rotation of shaft 80 respectively. Obviously, as the speed of shaft 80 is increased, the material will be discharged from the discharge spout 84 at a greater velocity.

FIGS. 12–16 illustrate a modified form of the material spreader which is generally designated by the reference numeral 10'. Spreader 10' is substantially identical to spreader 10 except that the blower means 68' has been modified somewhat. Due to the similarity of the spreaders 10 and 10', only the structure which extends from the lower end of spout portion 64' will be described but it should be understood that the spreader 10' is identical to spreader 10 from the lower end of spout portion 64' to the upper end of the hopper means.

A horizontal spout portion 170 is secured to the lower end of spout portion 64' and has a peripheral ring flange 172 secured thereto by welding or the like which extends radially outwardly therefrom as illustrated in FIG. 15. Flange 172 is provided with a plurality of square openings 174 formed therein through which a bolt 176 extends. The numeral 68' designates a blower means which is identical to blower means 68 with the exception that the deflecting plate 88 has been omitted therefrom. A sleeve 178 is secured to blower means 68' as illustrated in FIG. 15 and embraces spout portion 170. A flange 180 is secured to the outer end of sleeve 170 and extends radially outwardly therefrom in the manner best illustrated in FIG. 15. Flange 180 is provided with a plurality of arcuate slots 182 through which the bolts 176 extend. Bolts 176 are provided with a wing nut 182 and lock washer 184.

A finger 186 is welded to flange 180 and has an opening 188 formed therein which is adapted to receive one end of a link 190. Link 190 is maintained in opening 188 by means of a cotter key 192 extending therethrough. The other end of link 190 is detachably pivotally secured to a drive arm 192 which is secured to a power shaft 194 extending from an electric motor 196. Motor 196 is secured to spout portion 64' by means of a motor bracket 198. Motor 196 is provided with suitable control means (not shown) which is adapted to cause the rotation of power shaft 194 at a predetermined time.

In operation, the blower means 68 may be rotated about a horizontal axis with respect to the spout portion 170 by causing the energization of motor 196. The energization of motor 196 will cause the rotation of power shaft 194 which will cause drive arm 192 to be rotated which in turn will cause sleeve 178 and blower means 68' to be rotated due to the interconnection thereof as previously described. The bolts 176 serve to prevent the blower means 68' from becoming detached from the spreader and it can be appreciated that the rotation of the sleeve 178 is permitted due to the fact that the elongated slots 182 receive the bolts 176. Thus, when the activation of motor 196 has pivoted the drive arm 192 to one extreme position, the discharge chute 84' will be rotated to a position seen by broken lines in FIG. 13 and when the motor 196 has been operated by pivot the drive arm 192 to its other extreme position, the discharge chute 84' will be pivoted to the position illustrated in broken lines in FIG. 13. Thus, the operation of motor 196 permits the material to be discharged from the discharge chute 84' at a preselected angle so that the material can be evenly and uniformly deposited within the granary or the like. The embodiment seen in FIGS. 12–16 does not require a deflecting plate such as deflecting plate 88 but it can be appreciated that a deflecting plate similar to plate 88 could be installed on discharge chute 84' if so desired. The embodiment of FIGS. 12–16 provides that additional means for directing the discharge material from the discharge chute 84' and thus accomplishes at least all of its stated objectives.

Thus it can be seen that a material spreader has been provided which may be operated from a position remote of the granary and which may be operated to precisely and uniformly control the distribution of the material within the storage area. Thus it can be seen that the devices accomplish at least all of their stated objectives.

I claim:
1. In a device of the class described,
a hopper means having open upper and lower ends,
a vertically disposed spout means having an inlet opening at its upper end in communication with the lower end of said hopper means and being selectively rotatable with respect thereto, said spout means having a discharge opening formed therein at its lower end,
a material spreading apparatus operatively secured to said spout means and positioned below the discharge opening thereof, said material spreading apparatus adapted to receive material discharged from said spout means,
said material spreading apparatus includes a discharge end positioned laterally of said spout means,
first power means powering said material spreading apparatus to cause said apparatus to direct the material received thereby outwardly therefrom,
and second power means rotating said spout means and said material spreading apparatus about a vertical axis with respect to said hopper means,
said second power means including an electric motor secured to said spout means, said hopper means being supported by a frame means including a collar, said collar having a drive chain secured thereto and extending therearound, said electric motor having a gear secured to its power shaft which is in mesh with said drive chain, the activation of said electric motor causing said gear to be rotated thereby causing said spout means to be rotated about said hopper means and frame means,
the lower end of said hopper means being cylindrical, spout means having an upper cylindrical portion rotatably embracing the hopper lower end, said hopper means being supported by a frame means including a collar extending around said spout means upper end, said collar having a roller means secured thereto which engages a flange extending from said spout means to limit the downward movement of said spout means with respect to said hopper means.

2. The device of claim 1 wherein a plurality of support arms are secured to said hopper means which extend downwardly therefrom, the lower ends of said support arms being positioned below and outwardly of the lower end of said hopper means, a first collar means secured to said support arms above the lower ends thereof and extending around the lower end of said hopper means and spaced outwardly therefrom, said spout means having its upper end rotatably positioned in said first collar means, said spout means having a horizontal peripheral flange means secured thereto and extending outwardly therefrom towards said first collar means, a roller means secured to said first collar means and rotatably engaging the underside of said horizontal peripheral flange to rotatably support said spout means, a second collar means secured to the lower ends of said support arms and extending around said spout means in a spaced relationship, a drive chain rigidly secured to said second collar means on the exterior surface thereof, said second power means comprising an electric motor secured to said spout means and having a drive gear in engagement with said drive chain, the energization of said electric motor causing said motor and said spout means to rotate about a vertical axis with respect to said hopper means.

3. The device of claim 2 wherein a guide roller means is secured to said first collar means which engages the exterior surface of said spout means, said guide roller means being rotatable about a horizontal axis.

References Cited

UNITED STATES PATENTS

| | | | |
|---|---|---|---|
| 2,318,881 | 5/1943 | Mundy | 214— 15 XR |
| 2,961,245 | 11/1960 | Romeiser. | |
| 3,158,408 | 11/1964 | Cymara | 302—60 |
| 3,194,081 | 7/1965 | Parsons et al. | 74—230.17 |

ROBERT G. SHERIDAN, Primary Examiner

U.S. Cl. X.R.

198—118, 128; 214—17